United States Patent
Wagle et al.

(10) Patent No.: US 11,618,842 B2
(45) Date of Patent: Apr. 4, 2023

(54) NANOSIZED DENDRIMERIC EPOXY RESIN TO PREVENT CASING-CASING ANNULUS PRESSURE ISSUES

(71) Applicant: SAUDI ARABIAN OIL COMPANY, Dhahran (SA)

(72) Inventors: Vikrant Wagle, Dhahran (SA); Jothibasu Ramasamy, Dhahran (SA); Abdullah S. Al-Yami, Dhahran (SA); Khawlah A. Alanqari, Al-Khubar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 74 days.

(21) Appl. No.: 17/014,148

(22) Filed: Sep. 8, 2020

(65) Prior Publication Data
US 2022/0073807 A1    Mar. 10, 2022

(51) Int. Cl.
*C09K 8/42* (2006.01)
*C09K 8/44* (2006.01)
*C08G 77/04* (2006.01)

(52) U.S. Cl.
CPC .............. *C09K 8/44* (2013.01); *C08G 77/045* (2013.01); *C09K 8/428* (2013.01)

(58) Field of Classification Search
CPC .......... C09K 8/42; C09K 8/426; C09K 8/428; C09K 8/44; C09K 8/467; E21B 33/13
See application file for complete search history.

(56) References Cited

U.S. PATENT DOCUMENTS

| | | | |
|---|---|---|---|
| 4,072,194 A | 2/1978 | Cole et al. | |
| 4,666,613 A | 5/1987 | Schapira et al. | |
| 5,503,227 A * | 4/1996 | Saponja | E21B 33/138 166/277 |
| 5,875,845 A | 3/1999 | Chatterji et al. | |
| 6,802,375 B2 | 10/2004 | Bosma et al. | |
| 8,235,116 B1 | 8/2012 | Burts, Jr. et al. | |
| 9,550,933 B2 | 1/2017 | Chatterji et al. | |
| 9,784,079 B2 | 10/2017 | Salla et al. | |
| 10,005,954 B2 | 6/2018 | Raysoni et al. | |
| 10,266,749 B2 | 4/2019 | Belakshe et al. | |
| 10,280,122 B2 | 5/2019 | Salla et al. | |

(Continued)

FOREIGN PATENT DOCUMENTS

| | | |
|---|---|---|
| CA | 2580304 A1 | 9/2007 |
| WO | 2015088513 A1 | 6/2015 |

(Continued)

OTHER PUBLICATIONS

Lian, Wei et al. Sealing Failure Mechanism and Control Method for Cement Sheath during Hydraulic Fracturing, Aug. 2020, ACS OMEGA (Year: 2020).*

(Continued)

*Primary Examiner* — Angela M DiTrani Leff
(74) *Attorney, Agent, or Firm* — Osha Bergman Watanabe & Burton LLP

(57) ABSTRACT

A method includes introducing an epoxy resin system to a wellbore defect in a wellbore. The epoxy resin system comprises a polyhedral oligomeric silsesquioxane (POSS) epoxy resin with at least one reactive group and a curing agent. The method includes maintaining the epoxy resin system in the wellbore such that a cured epoxy resin system product forms in the wellbore defect.

19 Claims, 2 Drawing Sheets

(56) References Cited

U.S. PATENT DOCUMENTS

| | | | |
|---|---|---|---|
| 10,344,200 B2 | 7/2019 | Salla et al. | |
| 10,914,134 B1* | 2/2021 | Harbi | E21B 33/038 |
| 2005/0109502 A1 | 5/2005 | Buc Slay et al. | |
| 2005/0272611 A1* | 12/2005 | Lord | C09K 8/80 |
| | | | 507/200 |
| 2008/0121436 A1* | 5/2008 | Slay | C08J 5/005 |
| | | | 175/371 |
| 2010/0326660 A1 | 12/2010 | Ballard et al. | |
| 2012/0283153 A1 | 11/2012 | McDaniel et al. | |
| 2012/0325474 A1 | 12/2012 | Bicerano | |
| 2013/0062049 A1 | 3/2013 | Ren et al. | |
| 2013/0098604 A1* | 4/2013 | Ramakrishnan | E21B 47/005 |
| | | | 166/250.01 |
| 2014/0018475 A1* | 1/2014 | Falkner | C08L 63/00 |
| | | | 523/458 |
| 2014/0027116 A1 | 1/2014 | Suresh et al. | |
| 2016/0208157 A1* | 7/2016 | Vo | C09K 8/506 |
| 2016/0312105 A1 | 10/2016 | Vo et al. | |
| 2018/0030332 A1 | 2/2018 | Chakraborty et al. | |
| 2018/0230367 A1 | 8/2018 | Eluru et al. | |
| 2018/0298720 A1* | 10/2018 | Billingham | E21B 33/138 |
| 2019/0225875 A1 | 7/2019 | Singh et al. | |

FOREIGN PATENT DOCUMENTS

| | | |
|---|---|---|
| WO | 2018088997 A1 | 5/2018 |
| WO | 2020046405 A1 | 3/2020 |
| WO | 2020046427 A1 | 3/2020 |

OTHER PUBLICATIONS

International Search Report and Written Opinion of the International Searching Authority issued in corresponding International Application No. PCT/US2020/055668, dated May 28, 2021 (13 pages).

* cited by examiner

NANOSIZED DENDRIMERIC EPOXY RESIN TO PREVENT CASING-CASING ANNULUS PRESSURE ISSUES

BACKGROUND

A wellbore forms a pathway capable of permitting both fluids and apparatus to traverse between the surface and a hydrocarbon-bearing formation, for example, a natural gas-bearing formation. Besides defining the void volume of the wellbore, the wellbore wall also acts as the interface through which fluid can transition between the subterranean formation and the interior of the wellbore. The wellbore wall can be unlined (that is, bare rock or formation, also referred to as an open hole) to permit such interaction with the formation or lined, such as by a tubular string (also referred to as a casing), so as to prevent such interactions.

When positioning a tubular string or a portion of a tubular string in the wellbore, the exterior surfaces of the tubular string and the wellbore wall form and define a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material in the wellbore annulus or the casing-casing annulus to seal the annulus.

Primary sealing refers to the process of initially sealing the annulus upon installation of the casing or other tubular string. Primary sealing may refer to initial sealing of the annulus between the exterior surface of the tubular string and the wellbore wall of the wellbore or initial sealing of a casing-casing annulus. Primary sealing forms a protective solid sheath around the exterior surface of the tubular string. Primary sealing in conventional wellbore installations may be performed with wellbore cement and, thus, may be commonly referred to as "primary cementing."

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed relate to a method that includes introducing an epoxy resin system to a wellbore defect in a wellbore. The epoxy resin system comprises a polyhedral oligomeric silsesquioxane (POSS) epoxy resin with at least one reactive group and a curing agent. The method also includes maintaining the epoxy resin system in the wellbore such that a cured epoxy resin system product forms in the wellbore defect.

Other aspects and advantages of this disclosure will be apparent from the following description made with reference to the accompanying drawings and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

In the figures, down are toward or at the bottom and up are toward or at the top of the figure. "Up" and "down" are generally oriented relative to a local vertical direction. However, as used throughout this disclosure, the terms "uphole" and "downhole" may refer to a position within a wellbore relative to the surface, with "uphole" indicating direction or position closer to the surface and "downhole" referring to direction or position farther away from the surface. One of ordinary skill in the art understands that an object or a process may be "uphole" or "downhole" of another object or process while having the same true vertical depth relative to the surface of the earth.

DETAILED DESCRIPTION

Embodiments of the present disclosure relate generally to use of an epoxy resin system within a wellbore, which when cured, can act as a barrier to prevent fluid leaks into a casing-casing annulus. During hydrocarbon production, cement in any location in the wellbore may be subjected to temperature and pressure cycling. This temperature and pressure cycling may cause micro-cracks to form in the cement sheath. Fluids, such as formation gas or liquids, may then migrate through the micro-cracks, which may cause pressure buildup in the annuli, referred to as casing-casing annulus pressure. Increasing casing-casing annulus pressure caused by micro-cracks in the cement sheath may cause damage to interior structures of the well, such as interior casings and production liners. Increased casing-casing annulus pressure may also cause hydrocarbon-based formation fluids, including formation water as well as liquid and gaseous hydrocarbons, to migrate through the cement sheath to the surface, where the fluids may be released to the environment. These effects of fluid migration are even more pronounced in wells for hydrocarbon gases.

Figure 1:
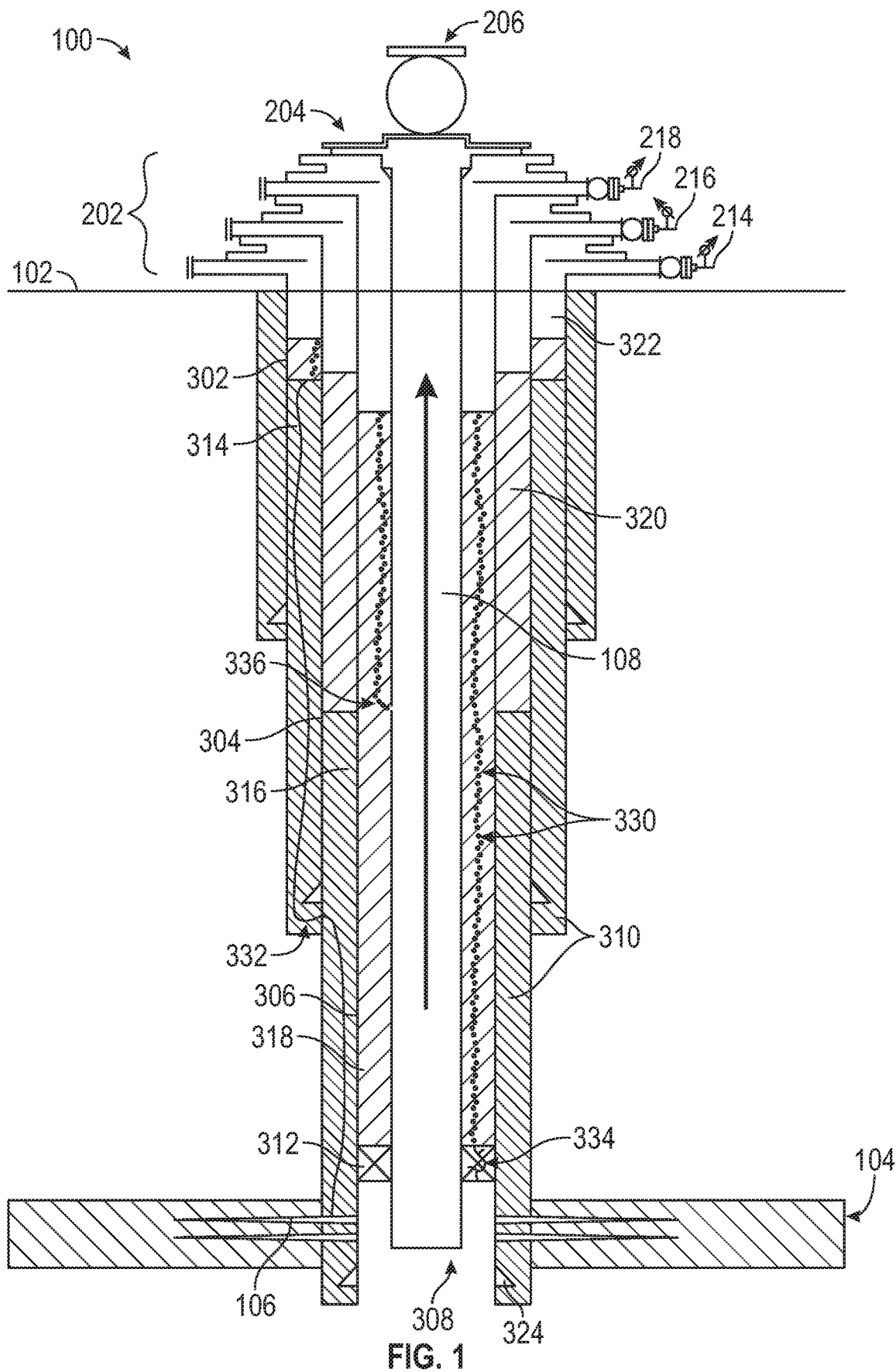
FIG. 1 shows a schematic of a production well.

FIG. 1 shows a schematic of a production well. Production well 100 shows a wellbore that has been formed from the surface 102 to a hydrocarbon-bearing formation 104. It is understood that the wellbore in FIG. 1 is represented vertically; however, the wellbore may also be configured as a deviated or a horizontal well. As previously described, production well 100 is configured such that hydrocarbons may pass from hydrocarbon-bearing formation 104 perforations 106. The production flow (arrow 108) traverses the wellbore uphole to the surface 102, passes through casing head 202 and tubing head 204, and onward towards downstream refining and collection units.

As previously described, production well 100 is series of nested casing and tubing strings. Production well 100 is shown having three casings and one production tubing, specifically, surface casing 302, intermediate casing 304, production casing 306, and production tubing 308. The casings 302, 304, 306 are hung from the surface 102 via casing head 202 and secured in position with cement 310. The production tubing 308 is hung from the surface 102 via tubing head 204 using tubing hangar 206 and is secured against production casing 306 using a production packer 312.

Annuli are formed between the various casing strings and production tubing. C-annulus 314 is a void formed between surface casing 302 and intermediate casing 304. B-annulus 316 is a void formed between intermediate casing 304 and production casing 306. A-annulus 318 is a void formed between production casing 306 and production tubing 308.

The various annuli are filled with not only residuals from the process of forming the wellbore but also materials to secure against the migration of formation fluids to the surface in a non-controlled manner. As shown, C-annulus 314 and B-annulus 316 both include cement 310 as part of their construction. All three annuli 314, 316, and 318 include residual mud 320 that was displaced from the wellbore either during the cementing operation for securing the various casings 302, 304, 306 or from locating the production packer 312 in their respective positions. All three annuli 314, 316, and 318 include a gas buffer space 322 as well.

The gas buffer space in each annulus is monitored to determine if there are potential casing-casing annular leaks in the wellbore. C-annulus pressure monitor 214 on casing head 202 is in fluid communication with the C-annulus 314 such that the pressure in the annulus may be observed. B-annulus pressure monitor 216 on casing head 202 is in fluid communication with the B-annulus 316 such that the pressure in the annulus may be observed. A-annulus pressure monitor 218 on casing head 202 is in fluid communication with the A-annulus 318 such that the pressure in the annulus may be observed.

Fluid migration is an ongoing challenge, especially in gas wells. Formation fluids, but especially natural gases such as methane and hydrogen sulfide, can migrate towards the surface through wellbore defects, such as microcracks and fissures. In doing so, formation conditions, such as pressure and acidity, may begin directly impacting (for example, physical deformation, debonding of cement, corrosion, seal failure) the structures of the wellbore. As seen in FIG. 1, production well 100 has several operational issues. Gas bubbles 330 are seen in residual mud 320 in both C-annulus 314 and A-annulus 318. Examples of potential wellbore defects include a seal failure 334 (mechanical, chemical) on production packer 312 permitting direct conveyance of formation fluids into A-annulus 318; cement crack 332 providing a fluid flow pathway from one of the perforations 106 through the cement 310 in B-annulus 316, around casing shoe 324, and into the cement 310 in C-annulus 314; and a seal failure 336 in production tubing 308 also permitting direct flow of production fluids into A-annulus 318. In such a situation, both A-annulus pressure monitor 218 and C-annulus pressure monitor 214 may show elevated pressure values for the respective gas buffer spaces 322 in each annulus 314, 318 as formation pressure elevates the pressure value.

Methods disclosed include application of an epoxy resin system within a wellbore. The epoxy resin system is comprised of a POSS epoxy resin, a curing agent, and optionally an additional epoxy resin. The epoxy resin system when cured can act as a barrier to prevent fluid leaks into a casing-casing annulus through means as previously described. The epoxy resin system can be used in either remedial or preventative operations to provide effective zonal isolation and to repair casing-casing annular leaks due to their ability of the cured epoxy resin system product to withstand significant differential pressure.

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" may refer to a fluid utilized to space apart any two other materials utilized in well production.

As used throughout this disclosure, the term "cure" or "curing," when used in the context of the epoxy resin systems, may refer to the process of cross-linking the epoxy resin, which is in a liquid form initially, with a curing agent to form a semi-solid or solid cured epoxy.

As used throughout this disclosure, the term "cure time," when used in the context of the epoxy resin system, may refer to a time duration between a first time at which a curing agent is added to the epoxy resins and a second time at which the epoxy resin system has cured to form at least a semi-solid epoxy.

As used throughout this disclosure, the term "substantial curing" refers to a degree of curing that produces a change of greater than 5 percent (%) in any rheological property of the epoxy resin system.

As used in this disclosure, the term "semi-solid" may refer to a state of the epoxy resin system that is between a liquid and a solid and in which the epoxy resin system exhibit greater elasticity and flexibility compared to compositions cured all the way to a rigid solid. In the semi-solid state, the cured epoxy resin system may be easily deformed but may return to shape upon releasing the deforming force.

Composition

As previously discussed, the epoxy resin system may include at least one POSS epoxy resin and at least one curing agent, and optionally an additional epoxy resin. As used in this disclosure, the term "epoxy resin system" may refer to the constituents that react to form the cured epoxy and may include, but are not limited to, the epoxy resins and curing agents. The epoxy resin system may generally exclude components and additives that do not participate in the polymerization reaction of the epoxy resin system.

Figure 2:
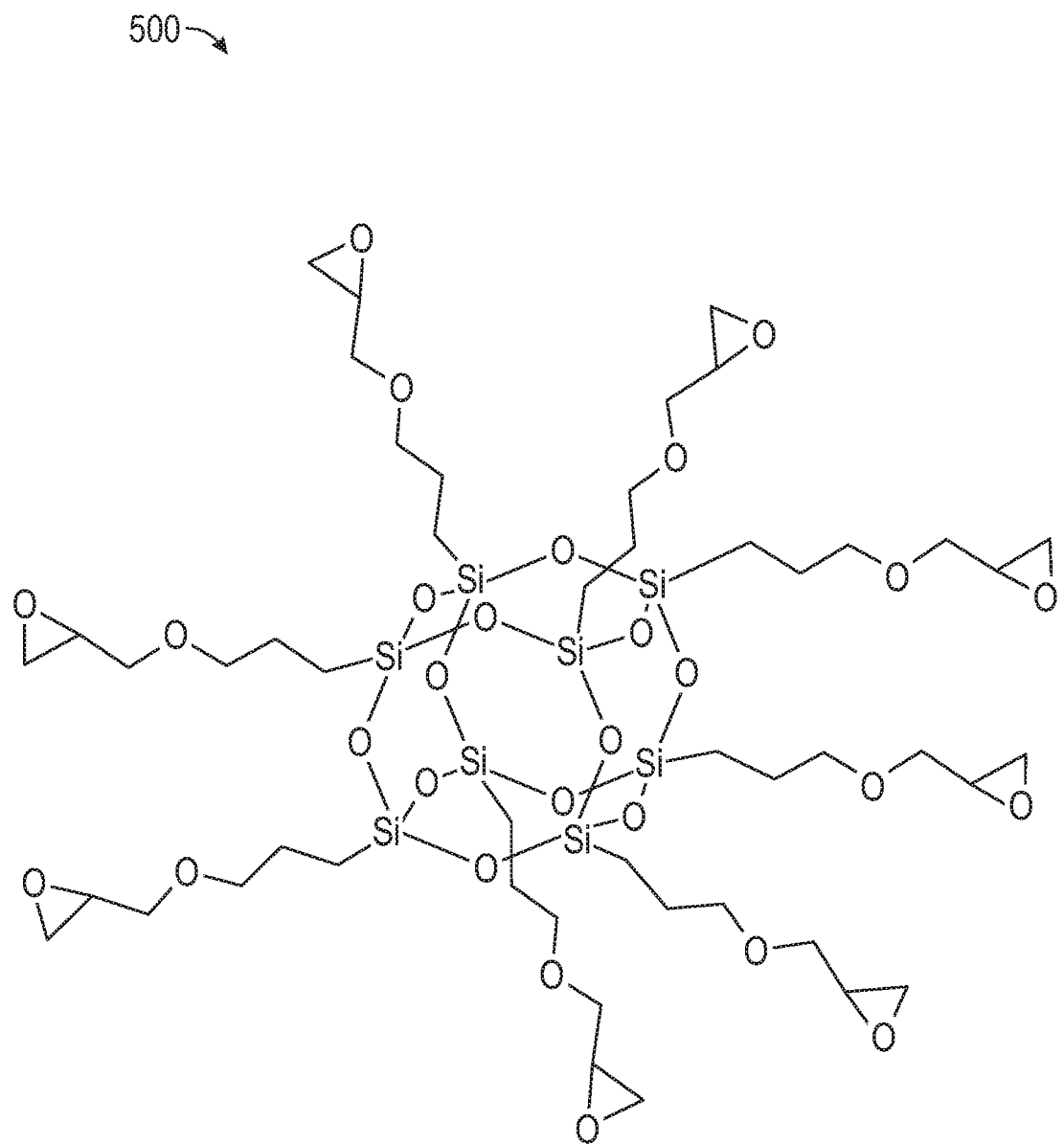
FIG. 2 shows a schematic of poly(glycidyl silsesquioxane), CAS NO. 68611-45-0.

The epoxy resin system includes at least one POSS epoxy resin. The abbreviation "POSS" stands for polyhedral oligomeric silsesquioxane. FIG. 2 shows a schematic of an example POSS, poly(glycidyl silsesquioxane), CAS NO. 68611-45-0 (item 500). The epoxy resin system includes a POSS epoxy resin that includes at least one curable group. In some embodiments, the POSS epoxy resin includes eight curable groups. In embodiments, a POSS epoxy resin includes a curable group that is reactive with a curing agent.

The POSS epoxy resin can include one or more different compositions of POSS. POSS is a polyorganosiloxane with a polyhedral chemical structure. The POSS can have the average unit formula $[R^1SiO_{1.5}]$, where at least one $R^1SiO_{1.5}$ unit in the POSS includes a curable group. The repeating unit of the POSS can have the structure:

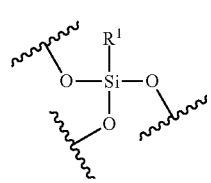

(Formula I)

where each silicon-bonded oxygen is bonded to another silicon atom, a hydrogen atom (for example, silanol), or to an independently selected $R^1$ as defined below. The POSS can have a total number of $[R^1SiO_{1.5}]$ units selected from the group consisting of 6, 7, 8, 9, 10, 11, and 12 and thus a corresponding number of curable groups. In embodiments, the POSS epoxy resin has 12 $[R^1SiO_{1.5}]$ units. The POSS can be any suitable POSS. The POSS can be a partially- or fully-caged. In embodiments, the POSS epoxy resin is fully-caged. Each corner of the POSS polyhedron can be occupied by a silicon atom, and each edge of the polyhedron can be formed by an Si—O—Si unit. The POSS can include at least three faces, with each face having a different plane, and with each face being defined as four interconnected $R_1SiO_{1.5}$ units, having the structure:

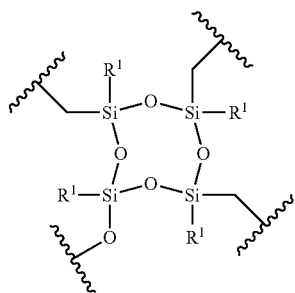

(Formula II)

In some embodiments, the POSS epoxy resin has six faces similar to that of a cube.

In some embodiments, the POSS can have a structure:

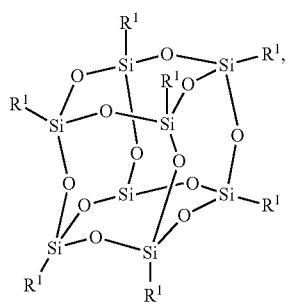

(Formula III)

where the variable $R^1$ in each of Formula I-III can be independently selected from the group consisting of ($C_1$-$C_{30}$)hydrocarbyl, ($C_1$-$C_{30}$)hydrocarbylene-CG, and -CG, where each ($C_1$-$C_{30}$)hydrocarbyl and ($C_1$-$C_{30}$)hydrocarbylene is independently substituted or unsubstituted and is interrupted or terminated by 0, 1, 2, or 3 substituted or unsubstituted S, O, P, or N atoms (where an unsubstituted atom designates, for example, the S, O, P, or N atom having no substituents or having —H thereon), and where "CG" is at least one curable group.

At least one $R^1$ in the POSS includes a curable group, such as an epoxide group. In some embodiments, the $R^1$ groups for the POSS epoxy resin are all the same. In some such embodiments, all the $R^1$ groups for the POSS epoxy resin are all glycidyl groups.

According to one or more aspects of the present disclosure, the epoxy resin system optionally includes at least one additional epoxy resin that is not the POSS epoxy resin. The epoxy resin system may include additional epoxy resins, including but not limited to, bisphenol-A-based epoxy resins, bisphenol-F-based epoxy resins, aliphatic epoxy resins, aromatic epoxy resins, Novalac resins, and combinations thereof. The epoxy resin system may include 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these. In one or more embodiments, the epoxy resin system may include bisphenol-A-epichlorohydrin epoxy resin and 2,3-epoxypropyl-o-tolyl ether.

Aliphatic and aromatic epoxy resins may include glycidyl ethers and diglycidyl ethers. Glycidyl ethers may include alkyl glycidyl ethers, aromatic glycidyl ethers, or both. Glycidyl ethers may have chemical formula (IV):

$$R^2-O-CH_2-(C_2H_3O) \qquad (IV),$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^2$ may be a branched, linear, or cyclic alkyl. In some embodiments, $R^2$ may include one or more substituted or unsubstituted aromatic rings. In some embodiments, the epoxy resin may include $C_{12}$-$C_{14}$ alkyl glycidyl ethers, butyl glycidyl ether, 2,3-epoxypropyl-o-tolyl ether, or combinations of these.

Diglycidyl ethers may have chemical formula (V):

$$(OC_2H_3)-CH_2-O-R^3-O-CH_2-(C_2H_3O) \qquad (V)$$

where $R^3$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^3$ may include one or more substituted or unsubstituted aromatic rings. In some embodiments, $R^3$ may be an alkyl group or cycloaklyl group. For example, in some embodiments, the epoxy resin may include 1,6-hexanediol diglycidyl ether, which has chemical formula (VI):

$$(OC_2H_3)-CH_2-O-C_6H_{12}-O-CH_2-(C_2H_3O) \qquad (VI).$$

In some embodiments, the epoxy resin may include cyclohexanedimethanol digylcidyl ether, which has chemical formula (VII):

$$(OC_2H_3)-CH_2-O-CH_2-(C_6H_{10})-CH_2-O-CH_2-(C_2H_3O) \qquad (VII).$$

The additional epoxy resin may include unmodified bisphenol-A-(epichlorohydrin) epoxy resin, which may have a epoxy equivalent weight (EEW) for about 160 g/eq and exhibit a dynamic viscosity (DV) of from about 2 mPa*s to about 10 mPa*s. The additional epoxy resin may include 2,3-epoxypropyl-o-tolyl ether, which may have an epoxy equivalent weight of from 170 g/eq to 190 g/eq and exhibit a dynamic viscosity of from 7 mPa*s to 10 mPa*s. The additional epoxy resin may include alkyl glycidyl ethers having from 12 to 14 carbon atoms, which may have an epoxy equivalent weight of from 270 g/eq to 305 g/eq and may exhibit a dynamic viscosity of from 5 mPa*s to 12 mPa*s. The additional epoxy resin may include 1,6-hexanediol diclycidyl ether, which may have an epoxy equivalent weight of from 150 g/eq to 170 g/eq and may exhibit a dynamic viscosity of from 20 mPa*s to 30 mPa*s. The additional epoxy resin may include cyclohexanedimethanol diglycidyl ether, which may have an epoxy equivalent weight of from 125 g/eq to 145 g/eq and may exhibit a dynamic viscosity of from 50 mPa*s to 70 mPa*s. The additional epoxy resin may include butyl glycidyl ether, which may have an epoxy equivalent weight of from 120 g/eq to 140 g/eq and may exhibit a dynamic viscosity of from 400 mPa*s to 500 mPa*s.

The epoxy resin system may include an amount of the epoxy resin sufficient to form a cured epoxy composition. For example, the epoxy resin system may include from about 15 wt. % to about 75 wt. % epoxy resin based on the total weight of the epoxy resin system before curing. The epoxy resin system may include from 15 wt. % to 70 wt. %, from 15 wt. % to 65 wt. %, from 15 wt. % to 60 wt. %, from 30 wt. % to 75 wt. %, from 30 wt. % to 70 wt. %, from 30 wt. % to 65 wt. %, from 30 wt. % to 60 wt. %, from 40 wt. % to 75 wt. %, from 40 wt. % to 70 wt. %, from 40 wt. % to 65 wt. %, from 40 wt. % to 60 wt. %, from 50 wt. % to 75 wt. %, from 50 wt. % to 70 wt. %, from 50 wt. % to 65 wt. %, or from 55 wt. % to 65 wt. % epoxy resin based on the total weight of the epoxy resin system before curing. The weight percentages for the epoxy resin, curing agent, and optional additional epoxy resin accelerator are provided for the epoxy resin system formulation at the time of preparing the epoxy resin system prior to any cross-linking or curing, which may change the chemical make-up of one or more of these constituents.

As previously discussed in this disclosure, the epoxy resin system includes a curing agent to cure the epoxy resin present in the epoxy resin system. The curing agent may include at least one amine group. Curing agents with amine functional groups may include, but are not limited to, at least one of an amine, polyamine, amine adduct, polyamine adduct, alkanolamine, phenalkamines, or a combinations of these. Amine or polyamine curing agents may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

The term "amine" as used refers to primary, secondary, and tertiary amines having, for example, the formula N(group)$_3$, where each 'group' can independently be H or non-H, such as alkyl and aryl. Amines include but are not limited to R—NH2, for example, alkylamines, arylamines, alkylarylamines; R$_2$NH where each R is independently selected, such as dialkylamines, diarylamines, arylalkylamines, and heterocyclylamines; and R$_3$N where each R is independently selected, such as trialkylamines, dialkylarylamines, alkyldiarylamines, and triarylamines. The term "amine" also includes ammonium ions as used.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), diethyltoluenediamine (DETDA), polyoxypropylene diamine, or combinations of these. In one or more embodiments, the curing agent may include at least one of DETA, DETDA, polyoxypropylene diamine, or combinations of these. In some such embodiments, the curing agent comprises DETA. In some embodiment, the epoxy resin system may include a plurality of curing agents.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from about 20 grams (g) to about 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g as determined according to the methods previously described in this disclosure.

The epoxy resin system may include an amount of curing agent sufficient to cure the epoxy resins in the epoxy resin system to a semi-solid or solid state. The epoxy resin system may include from 1 wt. % to 40 wt. % curing agent based on the total weight of the epoxy resin system before curing. In one or more embodiments, the epoxy resin system may have from about 1 wt. % to about 35 wt. %, from 1 wt. % to 30 wt. %, from 1 wt. % to 25 wt. %, from 1 wt. % to 20 wt. %, from 2 wt. % to 40 wt. %, from 2 wt. % to 35 wt. %, from 2 wt. % to 30 wt. %, from 2 wt. % to 25 wt. %, or from 2 wt. % to 20 wt. % curing agent based on the total weight of the epoxy resin system before curing.

In some embodiments, a diluent is included to assist in solvating the reactants as well as slow down the reaction process. Examples of useful diluents may include, but are not limited to, fractions of distilled hydrocarbons, such as mineral oils, kerosene, and diesel. Other examples include low viscous resins, such as Razeen® D 7106 from Jana Chemicals (Jubail Industrial City, Kingdom of Saudi Arabia), which is a reactive diluent for epoxy resin systems.

The various epoxy resins in the epoxy resin system may be in liquid form initially. Upon combining the various epoxy resins with the curing agents to form the epoxy resin system, the various epoxy resins react with the curing agents to convert into a resultant semi-solid or solid epoxy resin. Transition of the epoxy resin system from a liquid to a solid involves formation of covalent bonds via cross-linking reactions that initially results in an increase in viscosity in the epoxy resin system. Thus, during the curing process, the epoxy resin system may begin to form into a non-porous, three-dimensional thermoset polymer network. During the transition from fluid to solid through cross-linking, the increase of viscosity in the epoxy resin system may enable the epoxy resin system to continuously resist a pressure attempting to be communicated by the hydrocarbon-bearing formation through the casing-casing annulus. At such a point, a pressure differential may exist across the epoxy resin system. As the system continues to cure until completion, an impermeable barrier of cured epoxy polymer forms though which formation pressure is no longer communicated and a differential pressure may exist. At such time, the remediation is complete as the hydrocarbon-bearing formation no longer has a pathway to communicate with the surface that is not under control.

The epoxy resin system may have a cure time that enables the epoxy resin system to be introduced to the wellbore defect or the casing-casing annular space before the increase in viscosity causes operational issues, such as the inability to pump the curing fluid.

The curing time of the epoxy resin system may be inversely proportional to the amount of curing agent in the epoxy resin system. For example, increasing the amount of the curing agent in the epoxy resin system may decrease the curing time of the epoxy resin system. The epoxy resin system may include an amount of curing agent capable of curing the epoxy resin system to a semi-solid state in a cure time of less than or equal to 72 hours, less than or equal to 48 hours, less than or equal to 24 hours, less than or equal to 12 hours, or less than or equal to 8 hours, or less than or equal to 4 hours, or less than or equal to 2 hours, or less than or equal to 1 hour. As described previously in this disclosure, the term "semi-solid" refers to a state of the epoxy resin system that is between a liquid and a solid and in which the cured epoxy polymers exhibit greater elasticity and flexibility compared to an epoxy resin cured all the way to a rigid solid. In the semi-solid state, the epoxy resin systems may be easily deformed but may return to shape upon releasing the deforming force. The cured epoxy resin system in a semi-solid or solid state is configured to seal or proactively mitigate damage to the interior structure of the wellbore.

The embodiment epoxy resin system may be used for sealing damage to the interior structure of the wellbore under a range of different downhole conditions. For example, in some embodiments, the epoxy resin system may be adapted to different downhole conditions by changing the concentrations of the epoxy resin, the curing agents, or the additional epoxy resins to modify the specific gravity, viscosity, mechanical properties, curing time, or other properties of the epoxy resin system. The cured epoxy resin system product may be capable of withstanding a wide range of temperatures and pressures without failing or deteriorating, which otherwise would allow liquids or gases to penetrate into or through the cured epoxy resin system. As a non-limiting example, the epoxy resin system, once cured, may be capable of withstanding temperatures of from 20 degrees Celsius (° C.) to 205° C. The cured epoxy resin system may also be able to withstand temperature cycling within a temperature range of from 20° C. to 205° C. The cured epoxy resin system may be capable of withstanding pressures of up to 30,000 psid (206.8 megapascals differential (MPad)) (1 psi equals 0.00689476 MPa). For example, in some embodiments, the cured epoxy resin system may be capable of withstanding pressures of from 14 psid (96 kPa or 0.096 MPad) to 30,000 psi (206.8 MPa) without failing or deteriorating.

Method of Use

An embodiment of the method is disclosed for applying the epoxy resin system within a wellbore. The epoxy resin system is comprised of the POSS epoxy resin, the curing agent, and optionally the additional epoxy resin, each as previously described.

In some embodiments, the method includes detecting the presence of a wellbore defect. For example, observation of a variance over time in the value provided for by an annulus pressure monitor, such as previously describe in as associated with FIG. 1, may indicate the presence of a wellbore defect. Other means and methods for detecting the presence of a wellbore defect are known to those of skill in in the art.

One or more fluids may be introduced into the casing-casing annulus to prepare the site for repair. In some embodiments, the method may include introducing into the annular space a flushing fluid. Such a fluid may be introduced to drive out of the casing-casing annulus the fluids that previously occupied the space, such as drilling fluids, spacer fluids or liquid resultants from a prior cementing job. In some embodiments, the method may include introducing into the annular space a cleaning fluid. Such a fluid may be introduced to remove solid and liquid residues that may prevent adhesion to the casings and areas around the defect. In some other embodiments, the cleaning fluid may be an acidic or alkaline fluid. Such a fluid may be used to etch or score the surfaces around the defect to promote better adhesion by the reacting epoxy resin system.

In some embodiments, the method includes introducing to the wellbore defect an epoxy resin system. In some instances, the method of introduction comprises applying the epoxy resin system to the surface of the wellbore defect. For example, in reference to FIG. 1, where the wellbore defect is an open end of a cement crack 332 in one of the perforations 106, it may not be desired to completely seal off the perforation 106 to fluid flow. Application of excess epoxy resin system may accidentally seal off the perforation from hydrocarbon-formation production. For seal failure 336, it may not be desired to create a cured epoxy resin system product that could be "knocked off" or damaged by fluid flow or movement of mechanical items through the interior surface of the production tubing 308. Therefore, the epoxy resin system may be applied in a manner where it is partially-cured upon application or that it is applied topically. In another version, the epoxy resin system may be formulated such that it cures in a short period under wellbore conditions. This would avoid excess flow into the perforations while still covering the opening to the cement crack. It could also avoid a large surface buildup is avoided that could be later mechanically damaged or re-opened.

In other form of applying the epoxy resin system to the surface of a wellbore defect, a large quantity of the epoxy resin system can be introduced into the casing-casing annulus such that the epoxy resin system settles on top of the uphole part of the wellbore defect, spreads out and cures. For example, an amount of the epoxy resin system may be introduced into an annulus such that it fills a downhole portion of the annulus such that the wellbore defect is completely encased. Again, looking to FIG. 1, an amount of epoxy resin system may be introduced in C-annulus 314 via a flange of casing head 202 such that the introduced epoxy resin system, as it cures into cured epoxy resin system, displaces much of the mud in C-annulus 314 forming an impenetrable cap over the uphole end of cement crack 332. The same tactic could be done for the uphole end of seal failure 334 by introducing epoxy resin system through casing head 202 for A-annulus 318. As well, with enough material, seal failure 336 could also be remedied by filling up a substantial portion of A-annulus with epoxy resin system and permitting it to fully cure.

In some embodiments, the amount of the epoxy resin system introduced into the annulus space completely fills the annulus space, that is, there is no void space in the annulus. In instances where there is drilling mud or other fluid present in the annulus, the epoxy resin system and its cured resultant may displace such fluid as the epoxy resin system is introduced and the resin cures.

In other instances, the method of introduction comprises applying the epoxy resins system under pressure such that the epoxy resins system pushes into the wellbore defect. Pushing the epoxy resin system into the wellbore defect permits the epoxy resin system to cure and seal at least part of the void created by the defect. This may also permit a reduced amount of epoxy resins system if only the amount to be used is the amount that seals the wellbore defect.

In some embodiments, after introducing the epoxy resin system to the wellbore defect, the epoxy resin system in the in the annulus of the wellbore is maintained such that the cured epoxy resin system product forms. Maintaining the annulus of the wellbore such that the epoxy resin system converts into a cured epoxy resin system product may or may not entail routine or non-routine actions, such as the operation of fluid pumps, the running or retrieval of piping, or the circulation of drilling or wellbore fluids in the wellbore. For example, if the defect to be repaired is open to the wellbore, the wellbore may have to be maintained as a pressure less than the annulus or risk creating inflow into the annulus while the epoxy resin system is curing. No additional chemical or physical interaction with the curing epoxy resin system should be required. In some embodiments, the epoxy resin system is maintained in a range of from about 1 hour to about 72 hours, during which time the cured epoxy resin system product forms.

After formation of the cured epoxy resin system product in the wellbore defect, the wellbore may be operated such that a pressure differential may be formed across the cured epoxy resin system product. In some embodiments, the cured epoxy resin system product is configured to withstand a differential pressure of up to about 30,000 per square inch differential (psid).

EXAMPLES

The following examples illustrate one or more features of the present disclosure. It should be understood that these examples are not intended to limit the scope of the disclosure or the appended claims in any manner.

Example 1

In the first experiment, 12.5 grams (g) of EP0409 is introduced into a sample tube. EP0409 is a glycidyl POSS cage mixture from Hybrid Plastics (Hattiesburg, Miss.), the formula of such structure shown in FIG. 2. A curing agent in the form of 1.6 g of RAZEENCURE® 931 is added to the sample tube. RAZEENCURE 931 is comprised of diethylenetriamine (DETA) and is available from Jana Chemicals (Jubail Industrial City, Kingdom of Saudi Arabia).

The amount of curing agent needed to cure the amount of introduced EP0409 fully was calculated based on the equivalent weight of the EP0409 and DETA, which was determined to be 12.3 parts by weight DETA per 100 parts by weight EP0409 resin. After addition of the curing agent to the epoxy resin, the sample was allowed to cure at 25° C.

Gelling time of the curing resin is the time at which the resin is unable to flow after addition of the curing agent. The gelling time of the resin was determined to be 3 hours. The resultant composition was allowed to cure for two days at room temperature, after which Example 1 was determined to be fully solid.

Example 2

For the second experiment, a mixture of 7.5 g of EP0409 and 17.5 g of RAZEEN® LR 2253 are introduced into a sample tube. RAZEEN LR 2254 is comprised of a mixture of bisphenol-A-(epichlorohydrin) epoxy resin (CAS 25068-38-6) and oxirane, mono[C12-14-alkyloxy)methyl] derivatives (CAS 68609-97-2). RAZEEN LR 2254 is available from Jana Chemicals (Jubail Industrial City, Kingdom of Saudi Arabia). The EP0409 and RAZEEN LR 2254 were added in a ratio of 30:70 by weight. The two resins were mixed well in the sample tube to obtain a homogenous mixture. Three grams of RAZEENCURE 931 is added to the mixture.

The amount of curing agent needed to cure the amount of introduced the resin mixture fully was calculated based on the equivalent weight of the resin mixture and DETA, which was determined to be 11.75 parts by weight of DETA per 100 parts by weight of the resin mixture. After addition of the curing agent to the resin mixture, the sample was allowed to cure at 25° C.

Gelling time of the curing resin is the time at which the resin is unable to flow after addition of the curing agent. The gelling time of the resin was determined to be 2.5 hours. The resultant composition was allowed to cure for two days at room temperature, after which Example 1 was determined to be fully solid.

Unless defined otherwise, all technical and scientific terms used have the same meaning as commonly understood by one of ordinary skill in the art to which these systems, apparatuses, methods, processes and compositions belong.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates the contrary. The verb "comprises" and its conjugated forms should be interpreted as referring to elements, components or steps in a non-exclusive manner. The referenced elements, components or steps may be present, utilized or combined with other elements, components or steps not expressly referenced.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A method, comprising:
    introducing an epoxy resin system to a wellbore defect that causes pressure build up in a casing-casing annulus in a production well extending from a surface to a formation having a perforation extending therein, and
    maintaining the epoxy resin system in the production well such that a cured epoxy resin system product forms in the wellbore defect so as to seal the wellbore defect without sealing off the perforation,
    where the epoxy resin system comprises a polyhedral oligomeric silsesquioxane (POSS) epoxy resin with at least one reactive group and a curing agent.

2. The method of claim 1 where the POSS epoxy resin is poly(glycidyl silsesquioxane).

3. The method of claim 1 where the curing agent is selected from the group consisting trimethyl hexamethylene diamine (TMD), diethylenetriamine (DETA), triethylenetetramine (TETA), metaxylenediamine (MXDA), aminoethylpiperazine (AEP), tetraethylenepentamine (TEPA), polyetheramine, isophoronediamine (IPDA), diethyltoluenediamine (DETDA), polyoxypropylene diamine, and combinations thereof.

4. The method of claim 1 where the epoxy resin system further comprises an additional epoxy resin.

5. The method of claim 4 where the additional epoxy resin comprises a mixture of bisphenol-A(epichlorohydrin) epoxy resin and a composition comprising oxirane, mono[C12-14-alkyloxy)methyl] derivatives.

6. The method of claim 1 where the epoxy resin system is introduced into the wellbore defect.

7. The method of claim 1 further comprising detecting the wellbore defect.

8. The method of claim 1 further comprising introducing into the casing-casing annulus a flushing fluid.

9. The method of claim 1 further comprising introducing into the casing-casing annulus a cleaning fluid.

10. The method of claim 9 where the cleaning fluid is an acidic fluid.

11. The method of claim 1 further comprising operating the production well such that a differential pressure forms across the cured epoxy resin system product.

12. The method of claim 11 where the cured epoxy resin system product in the wellbore defect is configured to withstand a differential pressure of up to about 30,000 psid (pounds per square inch differential) (206.8 megapascals differential (MPad)).

13. The method of claim 1 where the wellbore defect is a seal failure on a production packer.

14. The method of claim 1 where the wellbore defect is a cement crack in the casing-casing annulus.

15. The method of claim 1 where the wellbore defect is a seal failure in a production tubing.

16. The method of claim 1 further comprising detecting the wellbore defect by measuring the pressure in the casing-casing annulus.

17. The method of claim 1 where the cured epoxy resin system product prevents communication of formation pressure through the casing-casing annulus.

18. The method of claim 1 where the introducing the epoxy resin system to a wellbore defect comprises introducing the epoxy resin system though a casing head.

19. The method of claim 1 where the wellbore defect has an uphole part, wherein the cured epoxy resin system product forms on the uphole part.

* * * * *